Jan. 8, 1963　　　　　J. H. ROPER　　　　　3,072,112
SYSTEM FOR CAPTURING CRANKCASE GAS AND SOLIDS
Filed March 31, 1961
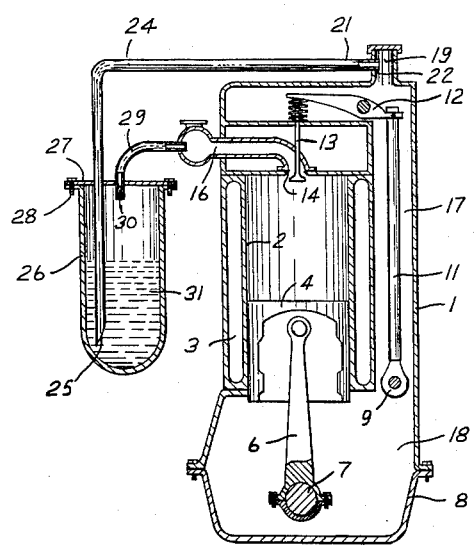
INVENTOR.
JOHN H. ROPER
BY
Woodhams Blanchard and Flynn
ATTORNEYS 3,072,112
SYSTEM FOR CAPTURING CRANKCASE
GAS AND SOLIDS
John H. Roper, Baltimore, Md., assignor to John Roper and Company, Inc., Baltimore, Md., a corporation of Maryland
Filed Mar. 31, 1961, Ser. No. 99,761
12 Claims. (Cl. 123—119)

This invention relates to internal combustion engines and particularly to means for capturing both gaseous and solid products of combustion which blow past the piston and otherwise tend to gather in the engine crankcase.

In the normal operation of internal combustion engines, there are products of combustion which blow past the piston of such engine and tend to gather in the engine crankcase. Such material will foul the oil in the crankcase and is one of the prime reasons for the previous necessity for changing engine oil at relatively frequent intervals, such as at every 2000 miles of operation of a vehicle in which such engine is installed.

Further, under previous practice the action of the engine pistons normally provided a somewhat super-atmospheric pressure within the crankcase of the engine, often of as much as 21 inches of water over atmospheric pressure. This results in a force pushing oil out through the bearings of the engine and thereby effects a certain amount of leakage beyond that necessary to the effective operation of the bearings. If such positive pressure were replaced by a small negative pressure, such as approximately —0.1 inch of water less than atmospheric pressure, then this tendency to drive oil out of the crankcase would be eliminated but without harm to the lubrication system of the engine.

Accordingly, the objects of the invention are:

(1) to provide apparatus attachable to a conventional internal combustion engine which will gather and isolate both gaseous and solid material entering the crankcase of an internal combustion engine and thereby prevent same from fouling the oil within said crankcase;

(2) to provide apparatus, as aforesaid, which will be extremely simple and accordingly which may be provided at a very low cost;

(3) to provide apparatus, as aforesaid, which will be extremely reliable in operation and hence may be utilized at a very low maintenance cost;

(4) to provide apparatus, as aforesaid, which can be utilized in the original construction of automotive engines with only a very slight modification from the present normal design of such engines;

(5) to provide a device, as aforesaid, which will reduce the pressure within the crankcase of an internal combustion engine and thereby minimize the escape of oil from such crankcase through the crankshaft bearings;

(6) to provide apparatus which will greatly reduce the consumption of lubricating oil required for an internal combustion engine, particularly of the automotive type, below that now accepted as normal;

(7) to provide apparatus which will minimize the smog forming components in automotive exhaust.

Other objects and purposes of the invention will become apparent to persons acquainted with apparatus of this general type upon reading the following disclosure and upon inspection of the accompanying drawings.

In the drawings:

The FIGURE shows somewhat schematically a central, longitudinal section of a cylinder of an internal combustion engine with apparatus according to the invention attached in operative position with respect thereto.

The invention arose out of an effort to lessen the oil consumption to improve the operation of an automotive type of internal combustion engine and therefore, for convenience, the invention will be described and illustrated in terms of automotive use. However, it will be recognized that, even though an automotive engine is utilized hereinafter for illustrative purposes, the invention is applicable in greater or lesser degree to any type of internal combustion engine and especially to any type thereof carrying a quantity of oil in its crankcase, which engines specifically may include among others both marine types and aircraft types. It will be further recognized that it is equally applicable to in-line cylinder arrangements, V-engines and radial engines.

Referring now to the drawing, there is shown a conventional engine block 1 having a cylinder 2 arranged therein with the usual cooling jacket 3, piston 4, connecting rod 6, and crankshaft 7 all provided therein in the usual manner. The block 1 has the usual pan 8 affixed at the bottom thereof. A camshaft 9 operates a push rod 11 to a conventional rocker 12 for operation of the inlet valve 13. The valve opening 14 is connected to the inlet manifold 16 in a conventional manner. The block 1 also provides, in a conventional manner, a passageway 17 connecting the crankcase zone 18 with a conventional vent 19 which is tightly capped.

The invention consists of a conduit 21 communicating in a convenient manner with the crankcase zone 18, such as by being connected at 22 into the vent 19. Said conduit is connected through a conduit 24 which extends into and close to the bottom of a container 26. The upper end 27 of said container is removably affixed to said container, such as by bolts 28, and a conduit 29 connects the interior of said container at a point near the upper end thereof through a restriction 30 to the intake manifold 16. Said container is partially filled with a liquid material 31, here ethylene glycol which is not readily volatile at the temperatures applied thereto but which will have ability to absorb or adsorb both gaseous and solid products of combustion, particularly those which blow past the piston and enter into the crankcase of the engine. Suitable examples of such materials are fuel oil, deca hydronapthalene, tetra hydronapthalene, ethyl napthalenes and turpentine.

The operation of the device is simple and will be readily understood.

Products of combustion which blow past the piston 4 enter into the crankcase zone 18 and are drawn by the low pressure in the manifold 16, up through the passageway 17, into the conduit 21, through the conduit 24 into the liquid body 31. The solid particles will gather at the bottom of the vessel 26 while the gaseous material bubbles up through the liquid body 31, some gaseous material being absorbed or adsorbed thereby thence through the passageway 29 into the manifold 16. To the extent that there are combustible materials within such gas, primarily carbon monoxide, such will have an opportunity to burn within the cylinder and will then go out through the normal engine exhaust (not shown).

In this manner, both gaseous and solid materials, but primarily solid materials, which would tend to blow past the piston 4 and enter into and foul the oil within the crankcase pan 8 will be given no opportunity to fall into such oil but will instead be drawn out of the crankcase and gather in the container 26.

The presence of the restriction 30 prevents excessive vacuum from being applied from and by the intake manifold of the engine onto the crankcase during the starting of the engine, which excessive vacuum might otherwise tend to draw portions of the oil body itself into the container 26. During normal operation of the engine such restriction 30 will have no adverse effect upon the operation of the apparatus above described.

While a small amount of such products of combustion may still be entrained into the oil within the crankcase by reason of the splashing of such oil during such normal engine operation, the amount of such products of combustion which will so enter into the body of oil in the crankcase will be greatly diminished and the oil remain usable for a much increased period of time. Actual road tests of vehicles equipped with the apparatus of the invention, have shown that an oil change is necessary at only about every 20,000 miles instead of every 2000 or 4000 miles.

The container 26 will normally be made of a transparent material so that the condition of the liquid body therein can be visually inspected as often as desired. When the mass of solid accumulation at the bottom of said container or the condition of liquid reaches a point where the container should be cleaned the liquid therein is replaced with fresh liquid.

The operation of the apparatus above described can be further improved and made more convenient by the use of a suitable pH indicator in the liquid body 31. For example, where ethylene glycol is used, ethylene glycol being colorless, a pH indicator, such as phenol red, bromcresol purple, chlorphenol red, bromothymol blue, p-nitrophenol, and azolitmin, has been found satisfactory. The amount of indicator can range from about 0.1 to about 0.01 percent (weights and percentages are by weight unless otherwise specified) but preferably will be about 0.05 percent. Suitably about 1 or 2 drops of an 0.1 percent aqueous solution for each 10 milliliters of ethylene glycol or other solvent will suffice. Further, a present commercial product sold by E. I. du Pont de Nemours & Co., of Wilmington, Delaware, under the trade name "Telar" which is comprised of ethylene glycol with such a pH indicator, has been found satisfactory. Actually it appears that any water-soluble, or water miscible or otherwise hydrophylic material capable of absorbing the products of combustion of an internal combustion engine, to which a pH indicator having a color change at a pH of between about 5–7 may be added, will be satisfactory. Suitable such solvents include polyhydroxy alcohols, such as glycol (ethylene glycol), glycerol, sorbitol, propylene glycol, diethylene glycol and the mono esters and ethers thereof such as the Cellosolves and Carbitols. The products of combustion of an internal combustion engine are normally acidic and will eventually cause the liquid body 31 to change in color. If desired a buffer, for example, tris (hydroxymethyl) aminomethane, or standard phosphate buffer adjusted to the desired pH, e.g., about pH 7.5, can be added, in the range of about 0.01 to 0.1 percent, advantageously about 0.05 percent, to the liquid body 31 to delay the reaching by the liquid body of such an acidic condition as to cause the indicator to change color. Preferably, the liquid will have a pH of about 7.5 and will change color at a pH of between 6.0 and 6.5. This in a typical operation, will occur after about 10,000 miles of ordinary passenger car operation and the change in color will indicate to the car operator that it is time for the liquid to be replaced with fresh liquid.

Although a particular preferred embodiment of the invention has been disclosed above in detail for illustrative purposes, it will be understood that variations or modifications of such disclosure, which lie within the scope of the appended claims are fully contemplated.

What is claimed is:

1. A device for withdrawing products of combustion from the crankcase of an internal combustion engine, said engine including a source of negative pressure, comprising in combination:

a container and a liquid within such container which is nonvolatile at substantially elevated temperatures, said liquid containing a pH indicator so that it will change color when its affinity for the gaseous components of said products of combustion falls below a predetermined value;

a first conduit connecting the crankcase of said engine to a point within said container and located below the level of such liquid;

a second conduit having a restriction therein connecting the zone above the level of such liquid with said source of negative pressure;

whereby products of combustion will be drawn by such negative pressure from said crankcase and into said liquid.

2. The device defined in claim 1 wherein said liquid is ethylene glycol.

3. A device for withdrawing products of combustion from the crankcase of an internal combustion engine, said engine including a source of negative pressure, comprising in combination:

a container and a liquid within such container which is nonvolatile at substantially elevated temperatures, said liquid being a hydrophylic liquid together with a pH indicator of such characteristics that same will be of one color at a pH value of at least 7.0 and will change color at a pH value of between about 6.0 and 6.5;

a first conduit connecting the crankcase of said engine to a point within said container and located below the level of such liquid;

a second conduit having a restriction therein connecting the zone above the level of such liquid with said source of negative pressure;

whereby products of combustion will be drawn by such negative pressure from said crankcase and into said liquid.

4. In a process which comprises withdrawing products of combustion from the crankcase of an internal combustion engine and scrubbing them with a non-volatile liquid to remove products of incomplete combustion, the method which comprises effecting the said scrubbing with a hydrophylic liquid containing an indicator showing a color change between about pH 6.0 and 6.5.

5. The process of claim 4 in which the indicator is phenol red.

6. The process of claim 5 in which the scrubbing liquid is ethylene glycol.

7. The process of claim 4 in which the scrubbing liquid includes a buffer having a buffering action above about pH 7.5.

8. The process of claim 7 in which the indicator is phenol red.

9. The process of claim 8 in which the scrubbing liquid is ethylene glycol.

10. The process of claim 7 in which the scrubbing liquid is ethylene glycol.

11. The process of claim 4 in which the scrubbing liquid is ethylene glycol.

12. A device for withdrawing products of combustion from the crankcase of an internal combustion engine, said engine including a source of negative pressure, comprising: a container and a liquid within said container, said liquid being hydrophylic and being nonvolatile at substantially elevated temperatures and containing a pH indicator;

a first conduit connecting the crankcase of said engine to a point within said container and located below the level of said liquid;

a second conduit connecting the zone above the level of said liquid with said source of negative pressure;

whereby products of combustion will be drawn by such negative pressure from said crankcase and into said liquid.

References Cited in the file of this patent

UNITED STATES PATENTS

| | | |
|---|---|---|
| 1,889,137 | White | Nov. 29, 1932 |
| 2,646,784 | McKeever | July 28, 1953 |